United States Patent [19]
Linn et al.

[11] 3,812,474

[45] May 21, 1974

[54] NUMERICAL CONTROL SYSTEM AND METHOD FOR VARIABLE SHAPE PROGRAMMING AND CONTROL OF MACHINE MOTION

[75] Inventors: Thomas Daniel Linn; John George Klauser, both of Holliston, Mass.; Alexander Jordan, Cranford; George Haig Tikijian, Maplewood, both of N.J.

[73] Assignee: Union Carbide Corporation, New York, N.Y.

[22] Filed: Jan. 3, 1972

[21] Appl. No.: 214,853

[52] U.S. Cl. .......... 340/172.5, 235/151.11, 318/569
[51] Int. Cl. ............................................. G06f 15/46
[58] Field of Search ............ 340/172.5; 235/151.11; 318/567, 569

[56] References Cited
UNITED STATES PATENTS

| | | | |
|---|---|---|---|
| 3,519,905 | 7/1970 | Little et al. | 340/172.5 X |
| 3,562,715 | 2/1971 | Bishop et al. | 340/172.5 |
| 3,348,208 | 10/1967 | Rosener | 340/172.5 |
| 3,356,994 | 12/1967 | Elbling | 340/172.5 |
| 3,518,513 | 6/1970 | Pomella et al. | 235/151.11 X |
| 3,665,280 | 5/1972 | Payne et al. | 235/151.11 X |

*Primary Examiner*—Paul J. Henon
*Assistant Examiner*—Melvin B. Chapnick
*Attorney, Agent, or Firm*—Paul A. Rose

[57] ABSTRACT

Numerical control system and method for automatically directing the movement of a machine along any prescribed path from a prepared input program containing a series of command instructions with each command represented by an array of characters defining a predetermined segment of the path expressed in terms of mathematical algorithms; the system including character recognition means, a memory section in which numerical data is stored, a data processing section, an output command data storage section and a path controller wherein the memory section is supplied with such numerical data independent of said command instructions and wherein the system operates upon such numerical data in accordance with the algorithms of the command instructions to define the coordinate dimensions for the prescribed path and in response thereto the path controller executes the commands.

12 Claims, 12 Drawing Figures

FIG. 1
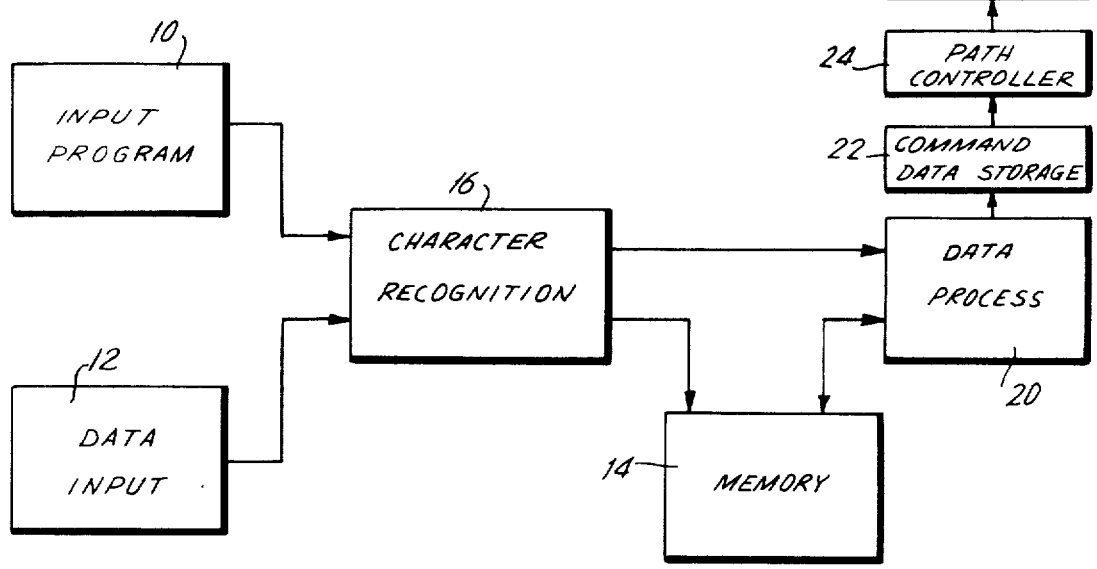
FIG. 2
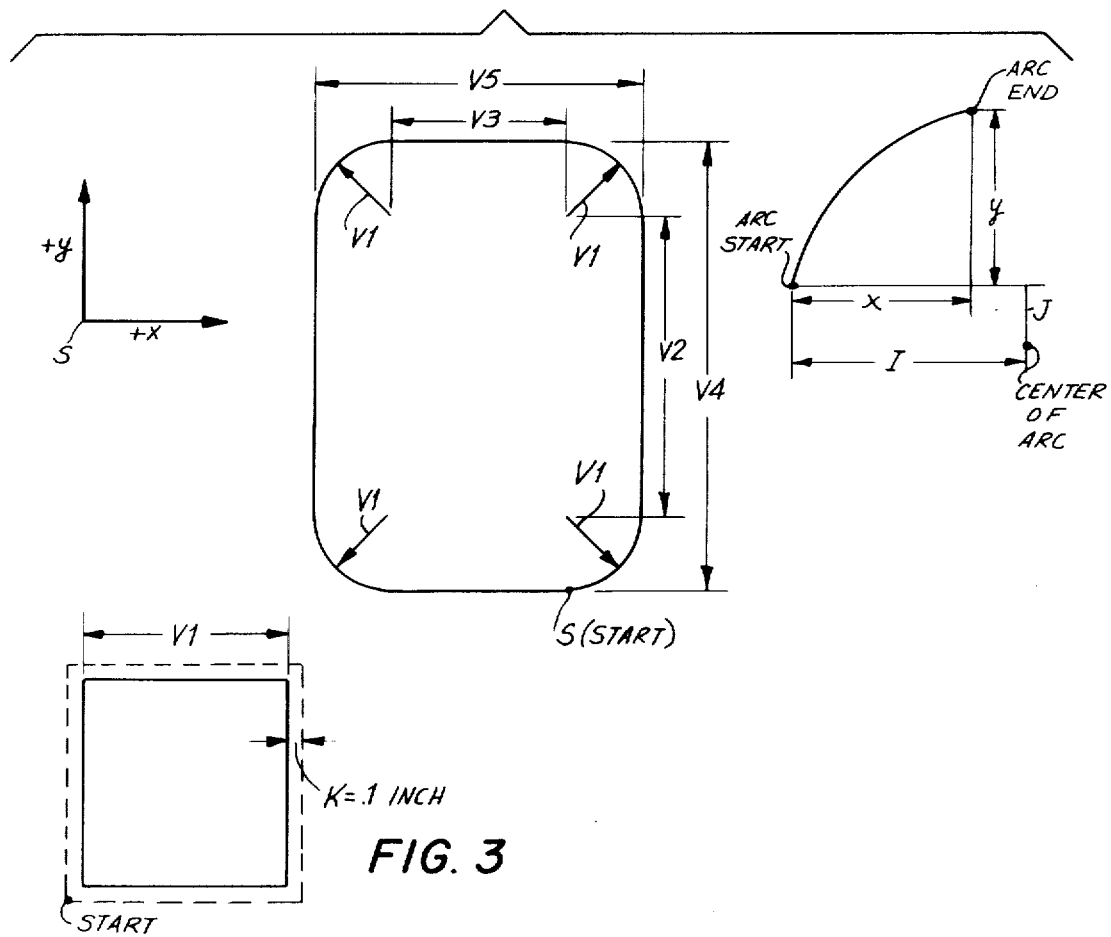
FIG. 3

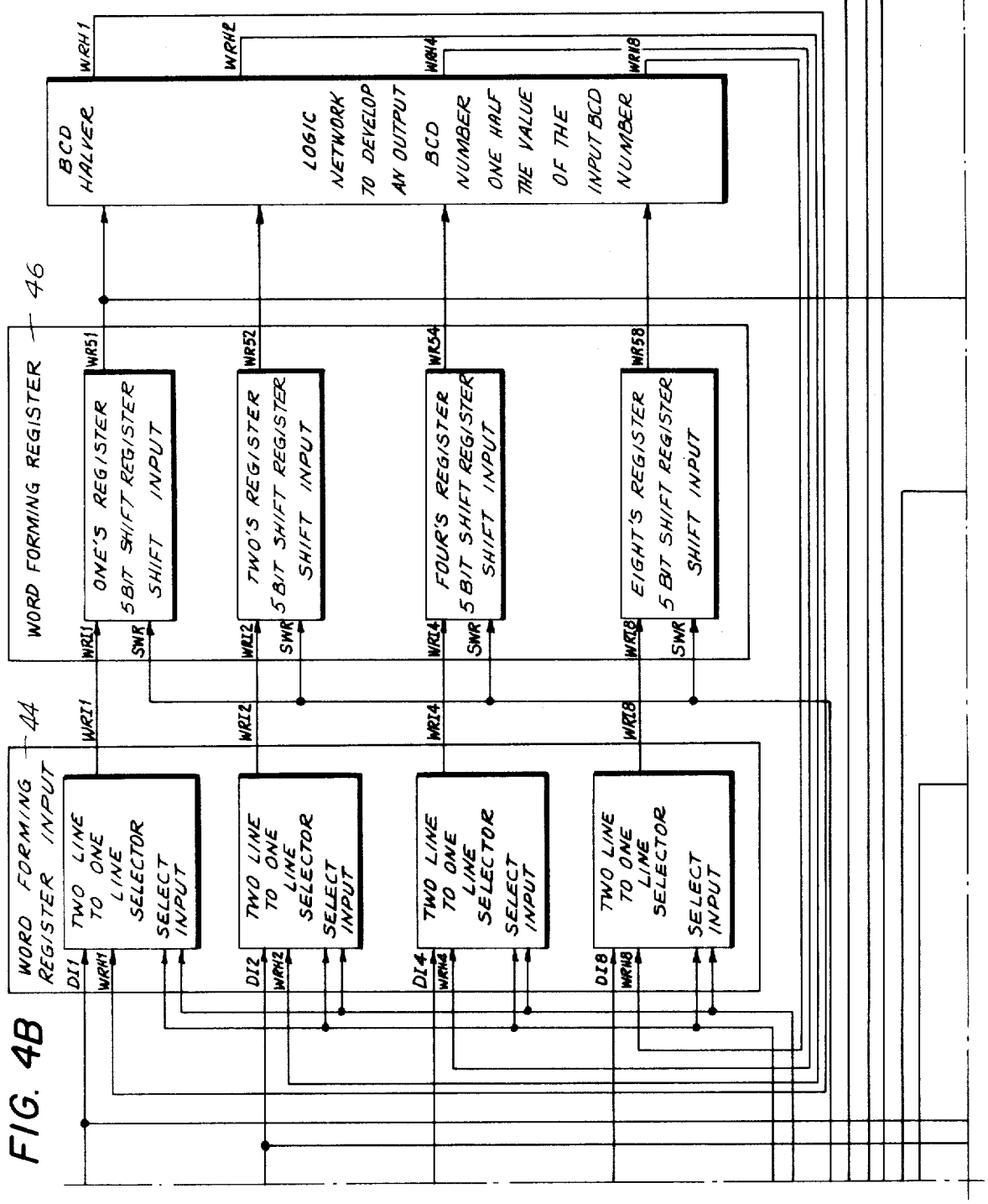

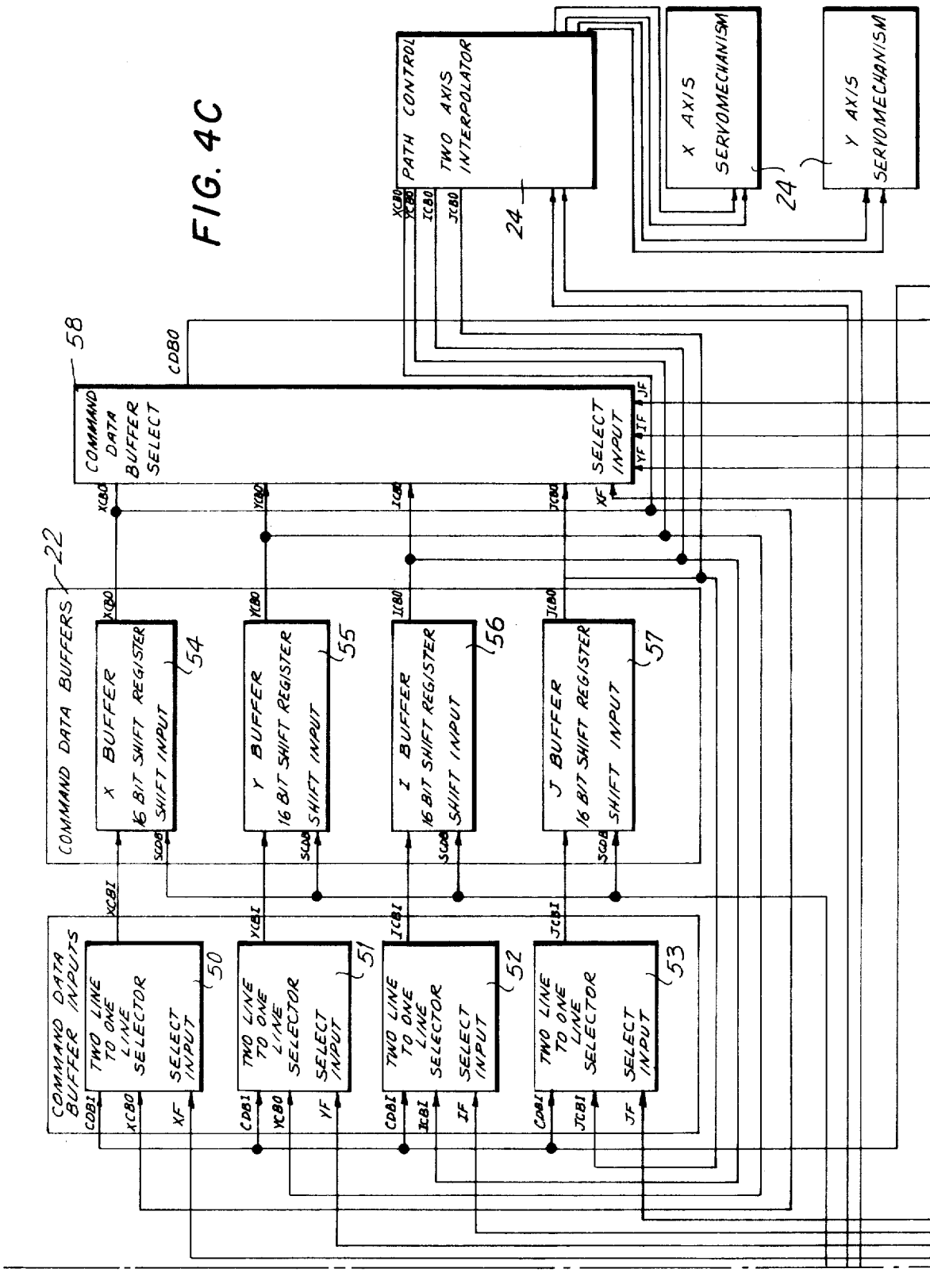

NUMERICAL CONTROL SYSTEM AND METHOD FOR VARIABLE SHAPE PROGRAMMING AND CONTROL OF MACHINE MOTION

This invention relates to a method and apparatus for automatically controlling the movement of a machine.

BACKGROUND OF THE INVENTION

Numerical control systems for guiding the motion of a machine in the fabrication of two and three dimensional shapes from working stock have been in use for quite sometime. Such systems operate by supplying information defining the shape to be generated in incremental segments representing straight lines and circular or other geometrically defined portions. Each segment of the shape in turn must be defined in terms of its coordinates along two or three reference axes respectively and with the corresponding dimensions for each coordinate. The input information to the system is usually prepared in advance on a punched tape or other storage medium which then represents the program for fabricating a given shape. A change in geometrical shape or a dimensional change for a given geometry or both necessitate the preparation of a new program. Although some machines include a plurality of fixed stored input programs providing some flexibility in the choice of shape the operator is still severely restricted to a finite number of given geometrical shapes and dimensions.

OBJECTS OF THE INVENTION

The primary object of the present invention is to provide a method and apparatus for automatically controlling the motion of a machine from a single program which permits the fabrication of any geometrical shape having any desired dimensions within a given family of shapes.

It is another object of the present invention to provide a method and apparatus for automatically controlling the motion of a machine wherein any shape may be generated without the requirement for specifically programming such shape and without the tedious effort of specifying in such program each coordinate dimension of each incremental segment making up such shape.

It is yet a further object of the present invention to provide an improved numerical control system for a machine which system is adapted to receive input information which represents generalized command instructions defining a generic family of shapes from which any desired shape having any desired dimensions may be generated.

Other objects and advantages of the present invention will become more fully apparent from the following specification, appended claims and accompanying drawings wherein:

DESCRIPTION OF THE DRAWINGS

FIG. 1 is a simplified functional block diagram illustrating the present invention;

FIG. 2 shows a simple shape which may be generated in accordance with the principle of the present invention;

FIG. 3 illustrates a simple square shape to be fabricated with its dimensions adjusted for a fixed tool kerf of 0.1 inches.

FIGS. 4A–4F represent a more complete block diagram of the present invention;

DETAILED DESCRIPTION OF THE INVENTION

Figure 4A:
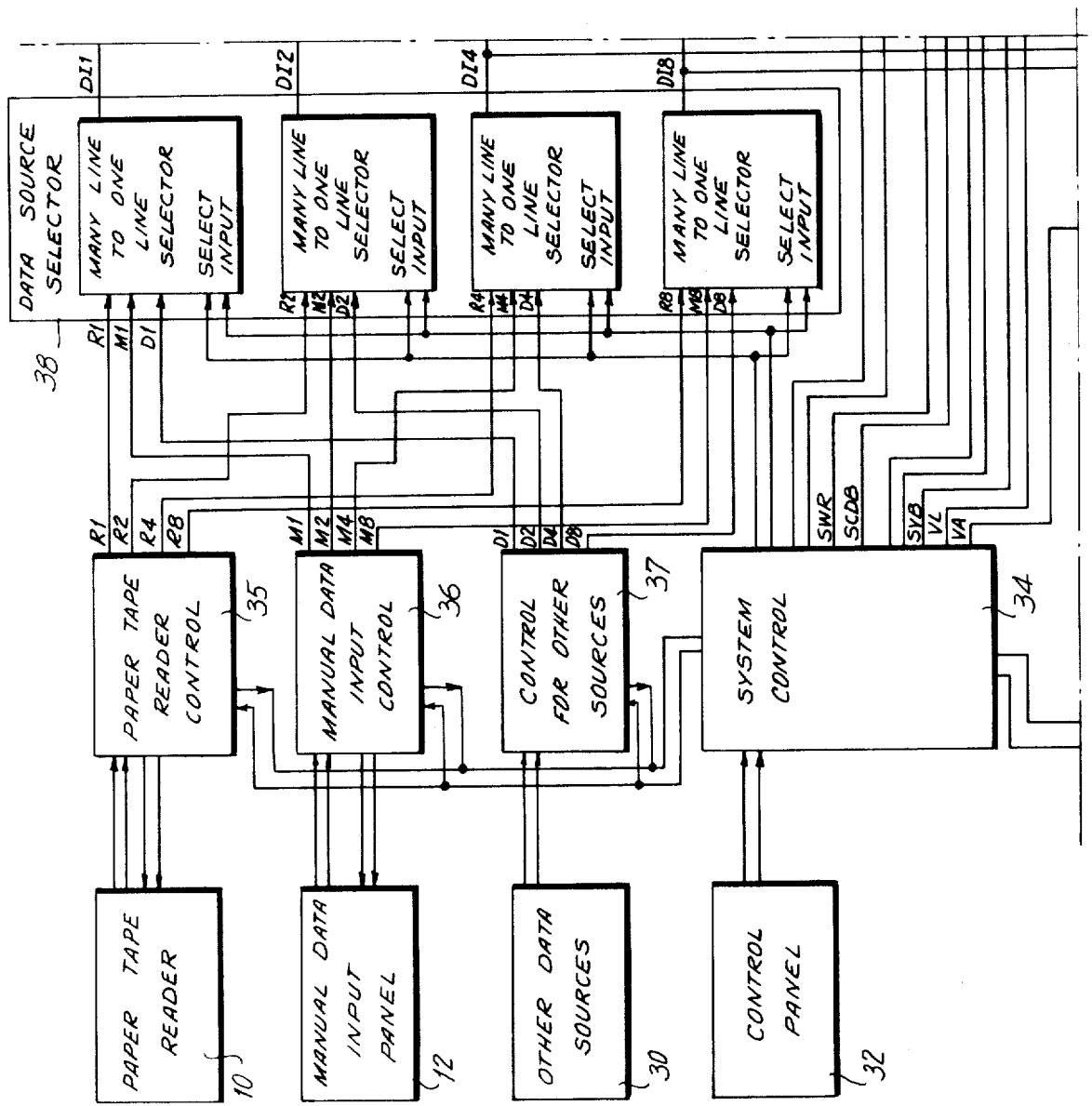
Figure 4D:
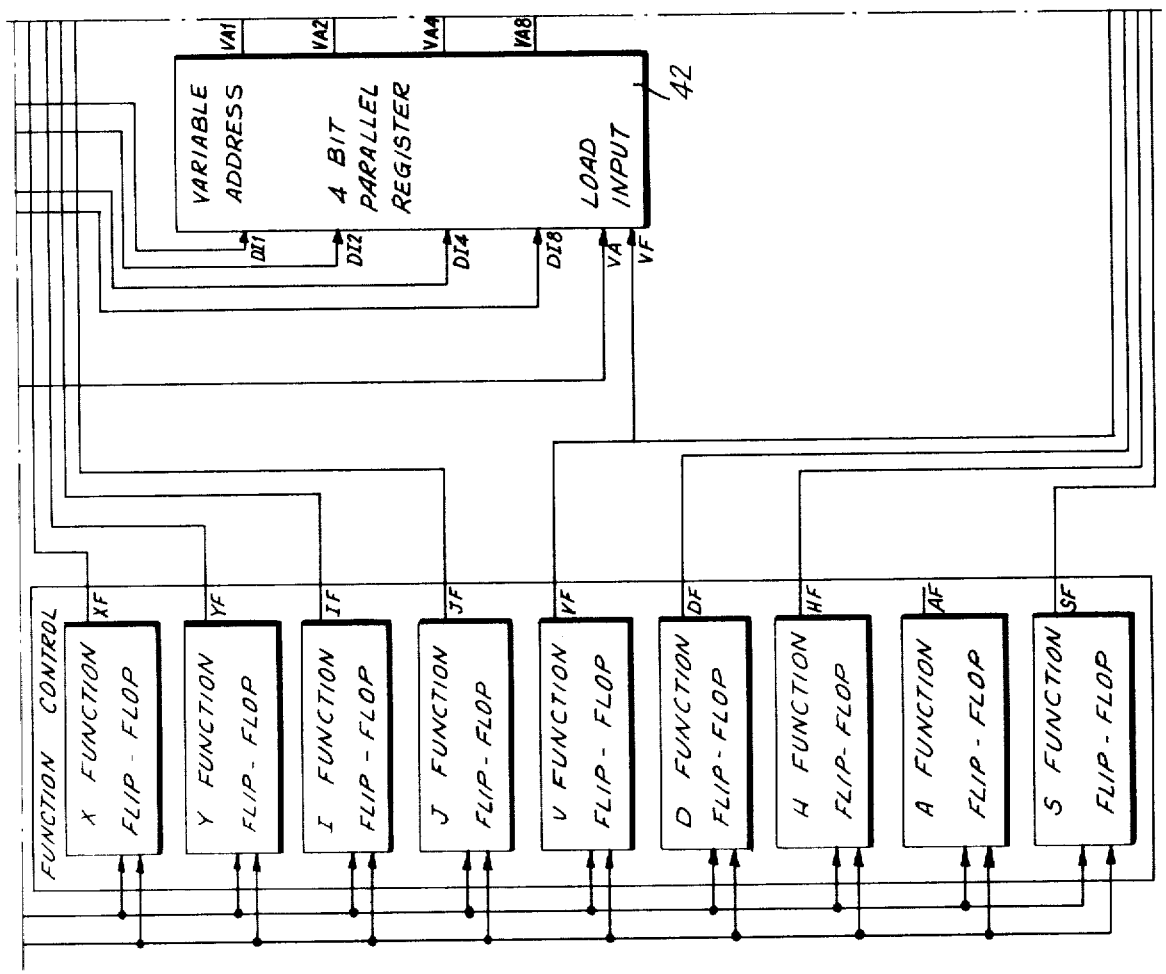
Figure 4E:
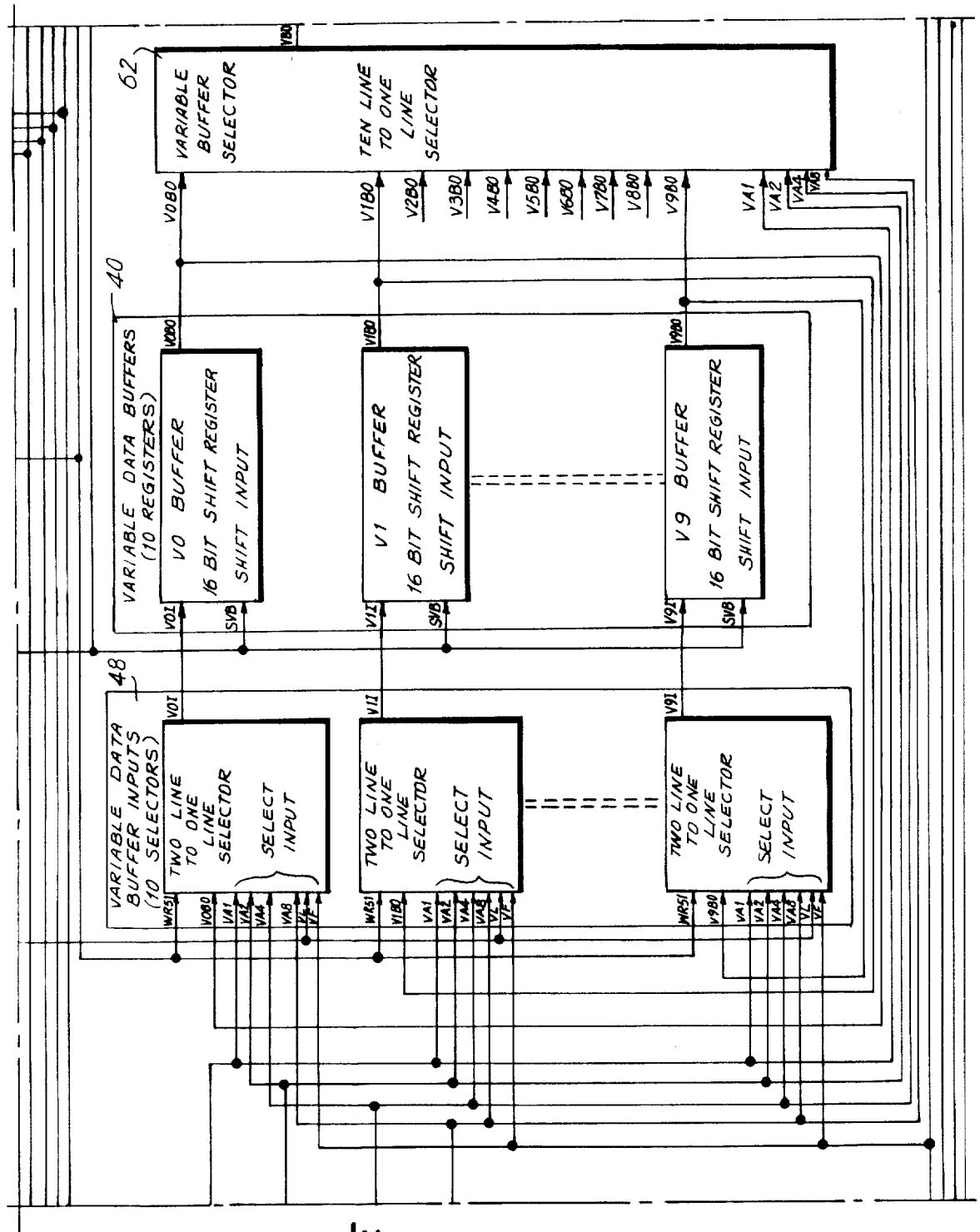
Figure 4F:
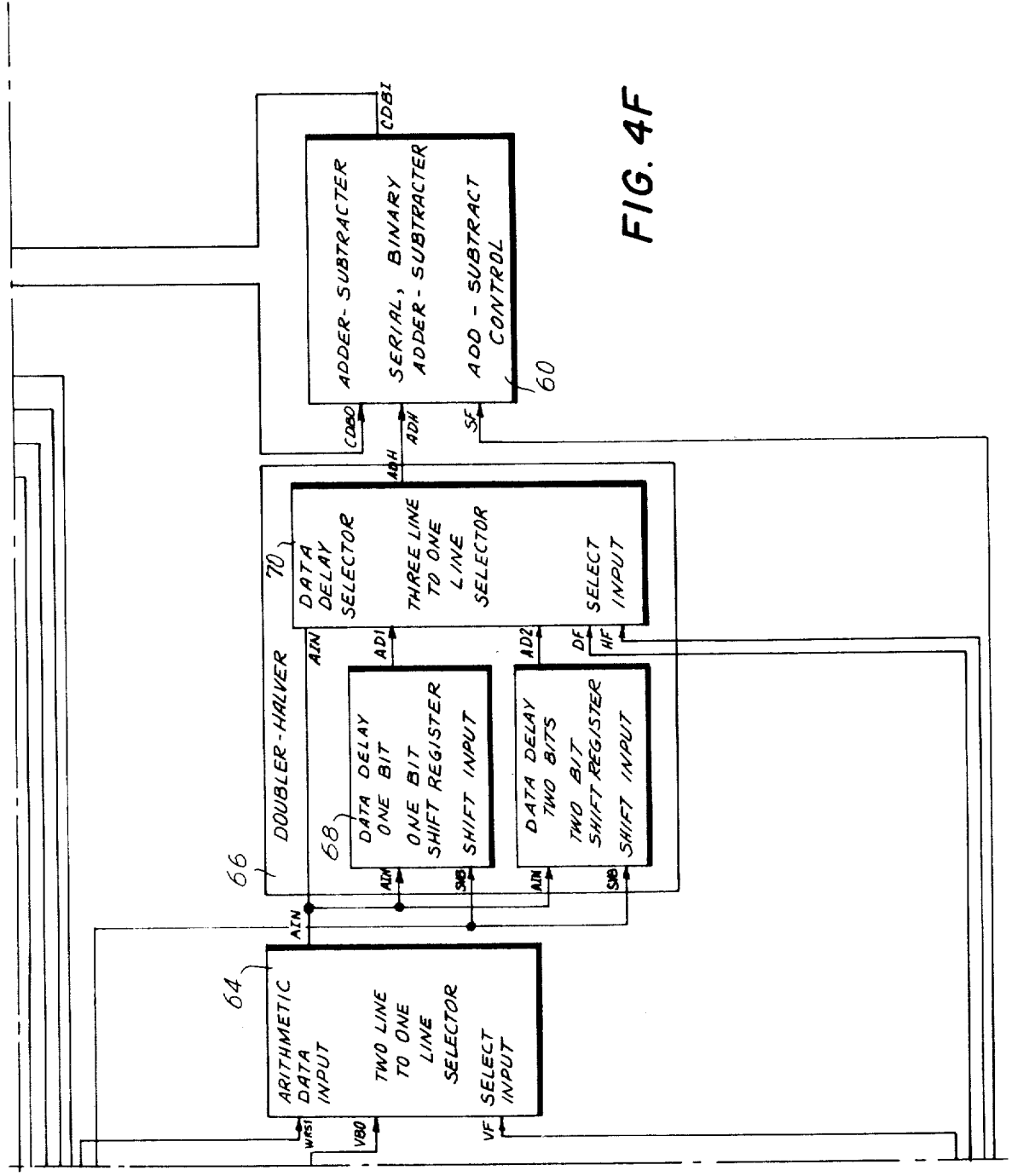

Referring now to FIG. 1, which is a functional block diagram illustrating the principles of the present invention, the machine M to be controlled may represent any conventional industrial machine for performing functions such as cutting, milling, turning, welding, grinding, etc., in which the machine is caused to traverse any desired path in response to an input program 10 recorded on any conventional information storage medium such as a punched tape, magnetic tape, film, et cetera.

The input program 10 does not however, contain, as is conventional, a detailed specification both as to the size and dimension of the shape to be generated. Instead, the program is prepared in the form of general commands representing a generic identification of a family of shapes. More specifically, the program is written as a series of command instructions representing respectively incremental segments of an entire path with each instruction written in terms of a mathematic expression defining the geometry of such respective segment; which expression will hereinafter, for purposes of the present disclosure, be referred to as an algorithm. Hence, the algorithm for a straight line segment along the X axis would simply read XV where X indicates direction and V denotes an assigned variable. Allocation of the variable is established through the system control of the present invention. The preparation of the program, notwithstanding the use of algorithms, follows conventional standards such as EIA standard RS-274-B. Thus the program for the simple geometrical shape illustrated in FIG. 2 would include the following command instructions:

G3XV1YV1JV1 G1YV2

G3X-V1YV1IV1 G1X-V3

G3X-V1Y-V1JV1 G1Y-V2

G3XV1Y-V1IV1 G1XV3

Where: V1 is the radius of the round corners, V2 is the length of the Y segment between the rounded corners and V3 is the length of the X segment between the rounded corners. As is conventional G characters represent preparatory functions identifying the type of curve to be formed i.e., straight line, arc, etc., defined as follows:

G1 = straight line
G2 = circular clockwise arc
G3 = circular counterclockwise arc The present invention will be described only in terms of combinations of the above type segments and will be limited for brevity to a machine adapted for motion control only along two operating axes in planes perpendicular to one another, which axes are illustrated in FIG. 2 as the "X" and "Y" axis, repsectively. In the preparation of the program a plus direction along the X or Y axis from the arbitrarily selected start position is assumed while a minus direction is specifically included. A straight line is defined in terms of its "X" and "Y" coordinates while a circular arc is defined in terms of "X", "Y", "I" and "J" coordinates where "I" and "J," as is conventional, represent the offset, if any, along the X and Y axis from the arc starting position to the center of the arc as illustrated in FIG. 2.

It should be apparent that the distinction between the program for the shape shown in FIG. 2 and a conventional program for such shape lies in use of the variables V. Any number of variables may be used each being distinguished by the number immediately following the variable. For present purposes the maximum number of applicable variables have been limited to ten designated as V0 – V9.

For the example program illustrated above the variables represent the specific dimensional distances for each segment. It is, however, customary to provide the programmer with only the more natural overall dimensions in specifying the shape to be machined. The system of the present invention permits the program to be prepared using algorithms which include variable arithmetic wherein each path segment is written as a mathematical expression the solution of which provides the coordinate dimensions. Hence, using the second command instruction of the above program as an example the "Y" dimension could be expressed as: Y = V4-(2)V1; or, in accordance with the programming procedure of the present invention, written as: YV4SDV1; where D is defined as a doubling function and S is a subtraction function. Assigning variables to the overall dimensions in FIG. 2 in combination with variable arithmetic eliminates the need for assigning a specific variable to each path segment. Variables may also be used in combination with numerical data. In FIG. 3, for example, the statement for one line segment adjusted for a fixed kerf of 0.1 inches would read XV1AD10 where A represents an add function.

Since the input program need not include actual dimensions and because of its flexible shape specification in algorithmic designation almost any path may be generated from such program limited only by the types of contours for which the system has been designed to handle, which for present purposes has been limited to straight lines in any direction and circular arcs.

Returning to FIG. 1, the data input block 12 may represent a manually operated keyboard or alternatively a second storage medium for recording dimensional information which may be varied at will. It is to be understood that information other than dimensional information may likewise be fed from this input to the system such as kerf, motion speed variables, etc. In order to maintain a distinction between dimensional data necessary to precisely define the coordinates of a given incremental segment and overall dimensional data defining the overall shape to be fabricated; all dimensional data will hereinafter be referred to as scaler information. The scaler information is fed from the data input block 12 to the data memory section 14 in a coded format similar to that for a command instruction. Using FIG. 2 as an illustrative example, its scaler information would be loaded into the memory 14 as follows:

G4V1100V4600V3500; where G4 is a preparatory load function, V1 100 means load the scaler number 1.00 into a first (namely V1) register of the memory, V4 600 means load the scaler number 6.00 into a second (namely V4) register of the memory, and V3500 means load the scaler number 5.00 into a third (namely V3) register of the memory. A decimal point is assumed at the 100th location. Some of the memory registers may be used to store information other than scaler data.

The character recognition section 16 identifies the G preparatory function for either loading data into the memory section 14 or processing the command instructions in response to the input program 10. The data process section 20 scans the memory 14 in response to each command instruction selecting appropriate scaler information in the allocated registers corresponding to the V variables and processes such data to derive, if necessary, each coordinate dimension for each axis of any given path segment. This information is in turn transferred to the command data storage section 22. Once a given path segment is fully defined the information is transferred to the path controller 24 for guiding the motion of the machine M. The character recognition, data memory, data process and command data storage section, respectively, in general defines the control system of the present invention. The operation of such system will be explained in greater detail in connection with FIGS. 4A–4F, 5 and FIGS. 6A and 6B. The path controller 24 is of itself conventional and includes logic circuitry for interpolating the coordinate information stored in the command data storage section and for controlling a servo drive which directly guides the machine M in a manner well known in the art.

The command data processing logic is shown in detail in the block diagrams of FIGS. 4A–4F, respectively. The primary function of this logic is to derive the X, Y, I and J command data values to be used by the path controller 24. The command values are derived from information given by the selected input data source and from the numbers stored in the ten variable data buffers in a manner to be hereafter discussed.

Referring now to FIG. 4A in which a plurality of input data sources 10, 12 and 30, respectively, are shown for supplying information to the system. The preferred modes for supplying information is through an input program on punched tape 10 and through a manually operated keyboard 12. The system of the present invention, however, is compatible for use with any other type of conventional data storage source 30.

Stated otherwise, the present invention is not limited to the particular type of data storage input source be it a punch paper tape machine, a manual keyboard, magnetic tape machine, etc., and as such appropriate interface logic circuitry would be necessary to signify the type of input storage medium from which the input program is originating, to control the intermittent "start-stop" of whichever data machine is selected, to consecutively feed each line of characters (logical one's and zero's) from the input stored program and to decode the characters pursuant to whichever conventional type format code is used. All such interface operations are conventional and form the basic coordinating functions between the chosen electromechanical hardware (source input) and the digital numerical control system. Such interface operations are unrelated to the present invention except in the sense that different data sources are preferably used to enter numerical information as distinct from command information. Thus, a different reader control is necessary for whichever data source is selected to perform the appropriate interface operations.

The operator selects the appropriate input data source through a switch on the control panel 32. The system control 34 is otherwise representative of the character recognition section 16 of FIG. 1 in that it scans each incoming character generating in response to each of certain recognized characters a predetermined control signal as will be further elaborated upon hereafter. Clock pulses are also generated to shift data in a conventional manner. Thus, the system control functions using conventional logic circuitry to produce the timing diagrams of FIG. 5, 6A, and 6B from which one skilled in the art could readily reproduce the circuits to generate such sequence of control and clock pulses. Moreover, since the present invention relates only to the data processing aspects of the numerical control system and not to the individual circuits which comprise the system, which circuits of themselves are available commercially as circuit units or are elementary from a logic design standpoint, it is deemed unnecessary to show the actual circuitry. Examples of integrated circuits which are commercially available and which could be availed of for the "blocks" shown in the block diagram of FIGS. 4A–4F are as follows: all of the "blocks" 39, 44, 48 50–53, 58, 62 and 70 are all data selectors such as Texas Inst. No. SN74150; the flip flops may be T.I. No. SN7474N; the circuit types such as T.I.-SN7496 and SN54164 may be used for the shift registers 40, 22 and 46, respectively, and block 60 may be made from using a full gate adder such as T.I.-SN5480 or T.I.-SN7480. Lastly, the BCD HALVER network is made up of conventional logic circuitry for converting a BCD number to a binary number as taught hereinafter on page 12 and which follows the conventional halving method outlined on page 6 of the text "Digital Computer Design Fundamentals" by Yaohan Chu.

Data is received from the selected input data source in an appropriately applied code such as the conventionally used EIA code which has eight channels for each line of information, one channel of which represents a parity check bit whereas the other seven channels are used to identify a character representing either a letter or a number. Four of the respective channels are used to define the specific number in binary format. The input controls 35, 36 and 37 include logic circuitry for identifying each character and for generating on its 1, 2, 4, 8 output lines logic pulses representing the binary number corresponding to any decimal digit from 0–9.

Figure 5:
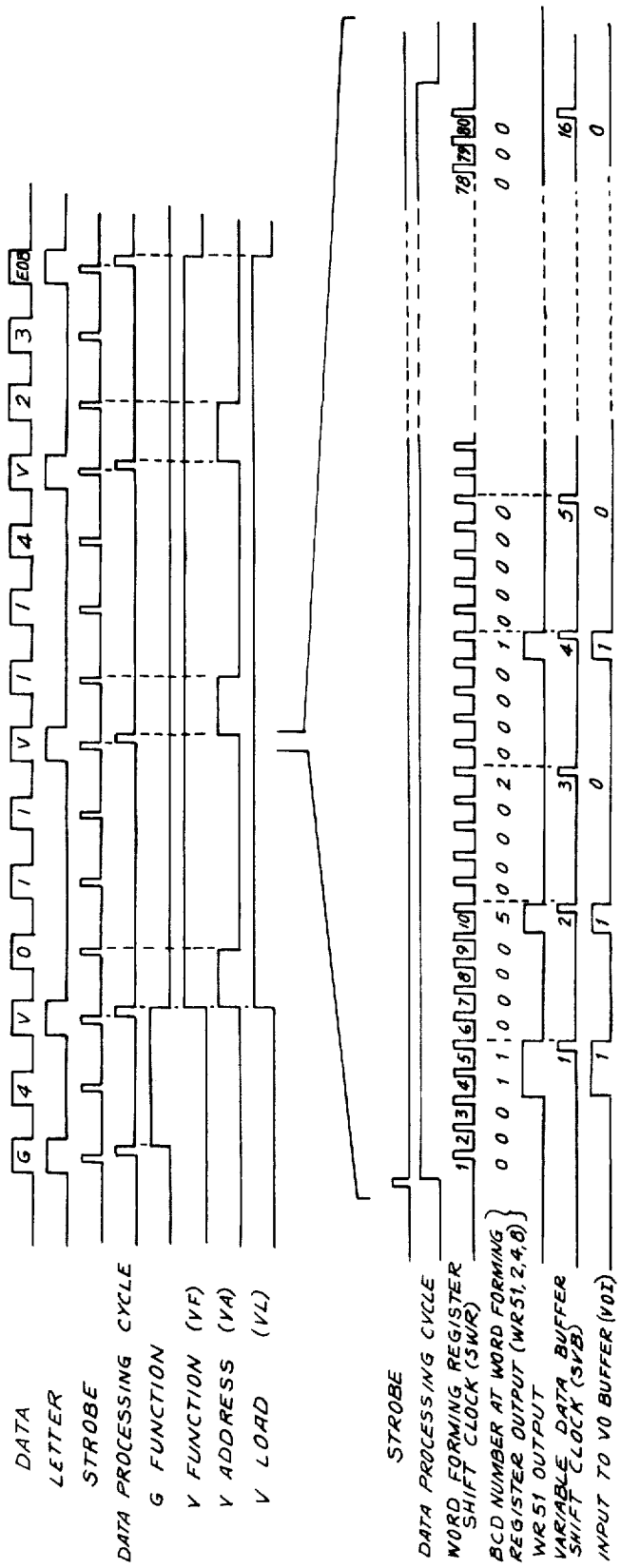
FIG. 5 is a timing diagram illustrating how data is loaded into the system.
Figure 6A:
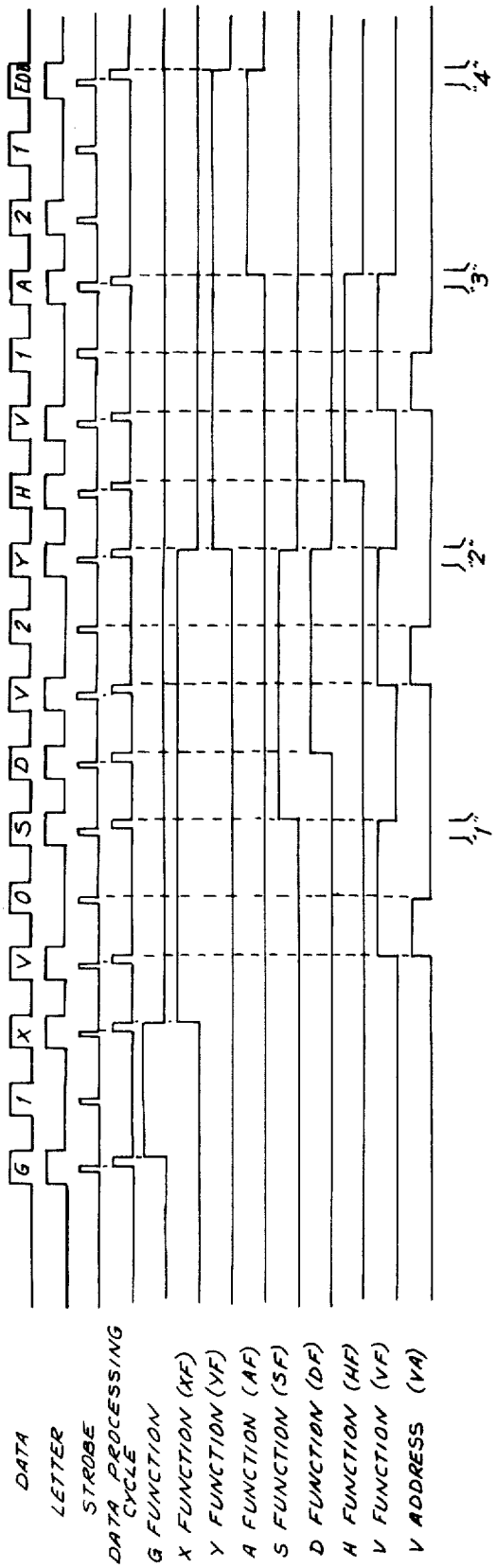
FIGS. 6A–6B represent further timing diagrams illustrating how a command instruction from the stored program generates the desired coordinate data information for controlling the motion of a machine.
Figure 6A:
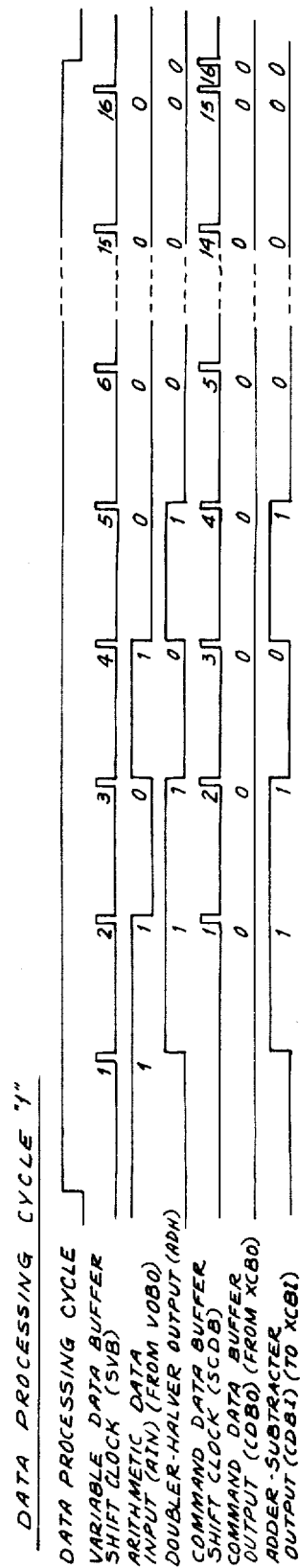
Figure 6B:
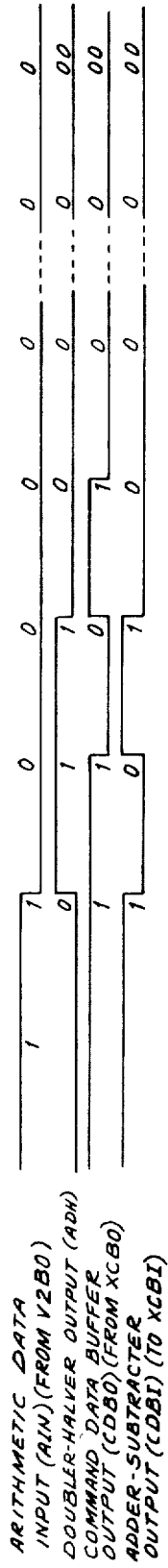
Figure 6B:
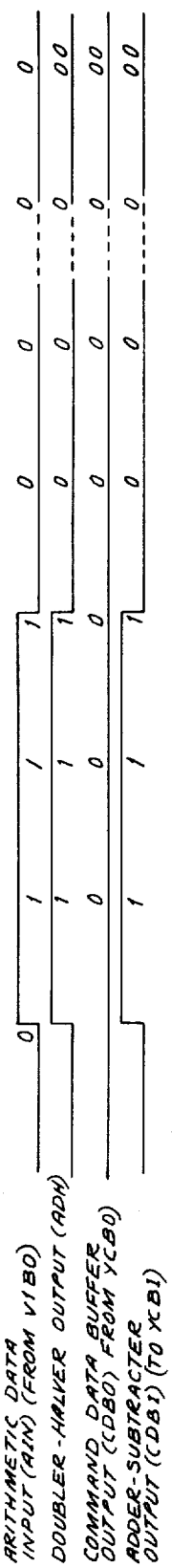
Figure 6B:
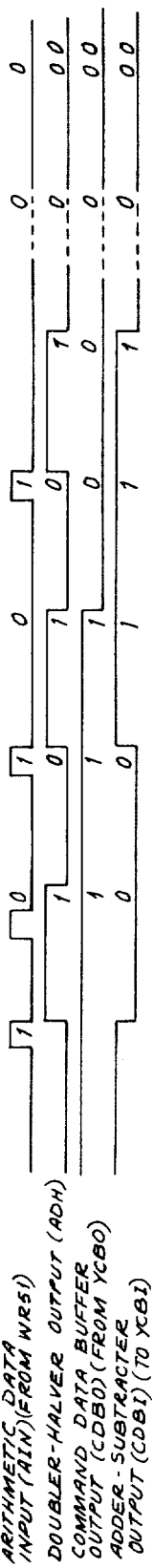

The operation of the logic circuitry of FIGS. 4A–4F is best explained in conjunction with the timing diagrams of FIG. 5 and FIGS. 6A and 6B.

The loading of the variable data buffers 40 (FIG. 4E) requires a processing of data in some aspects similar to the processing of the X, Y, I and J command data and because of its simpler nature, will be described first. The example given for illustrative purposes is: G4V011V114V23* where the asterisk represents the end of the block of information. This information block is set into the system from data source 30 or from the manual keyboard 12 with the operator's control panel 32 being appropriately adjusted.

A character is defined as either a letter or a number. All letters and such numbers which do not represent numerical data will hereinafter be referred to as operands. Since there are only ten data registers in memory and four preparatory functions only those numbers immediately following the letters V and G will function as operands with all other numbers representing numerical data. All letter operands initiate a data processing cycle but only the operands X, Y, I and J will, in addition, allow data to be entered into the command data buffers 22.

The reading of G4 will cause the system control 34 to generate a variable load signal VL thereby indicating that this block of data contains information to be loaded into the variable data buffers 40. The reading of the next character the letter V, causes the system control 34 to set the V function flip-flop generating the signal VF which indicates that the operation is involved with the variable data buffers, and to set the variable address signal VA indicating that the next character to be read will be a number operand identifying which of the variable data buffers 40 is to be processed. The VA and VF signals enable the variable address register 42. The next character, the operand zero, is routed through the data source selector 38 (FIG. 4A) and passed on output lines DI 1, 2, 4 and 8 in binary coded decimal form (0000) into the variable address register 42 (FIG. 4D) and the variable address signal VA is reset. The variable address register 42 on output lines VA 1, 2, 4 and 8 identifies in binary coded decimal form the specific variable data buffer 40 in which numerical information is to be loaded. The system control 34 then enables the word forming register input selectors 44 (FIG. 4B) to allow the reading of the next characters, numerical numbers 1 and 1, into the word forming register 46. Numerical data is received from the data source selector 38 in binary coded decimal form on lines DI 1, 2, 4, 8 and is as such routed through the word forming register input 44 and loaded most significant digit first from output lines WRI 1, 2, 4 and 8 into the word forming register 46. Thus the word forming register 46 now contains the number 00011 in binary coded decimal, bit parallel, character serial form (leading zeroes are implied and can be omitted in the input program).

The reading of the second V letter indicates the end of the input information associated with the first V letter and a data processing cycle is initiated as shown in the lower half of the timing diagram of FIG. 5. Two operations must be accomplished during this data processing cycle: the binary coded decimal number in the word forming register 46 must be converted to a binary number and the binary number must be directed into the V0 variable data buffer. The conversion is accomplished by repeated division by two and checking the remainder in the following described manner.

The word forming register 46 receives 80 shift clock pulses SWR from the system control 34 which allows 16 shift arounds of five clock pulses each. The BCD halver (FIG. 4b) reads the word forming register output on lines WR5 1, 2, 3 and 8 and inserts into the word forming register 46 a number one half in value, on lines WRI 1, 2, 4 and 8 , during each shift around. At the fifth clock pulse of each shift around, the least significant digit is at the word forming register output on lines WR5 1,2,4,8 and the state of the least significant bit on line WR5 1 of this digit indicates whether the BDC number just shifted through will produce a remainder or not. Thus, if during the fifth clock pulse of the first shift around, the signal WRS1 is a logical one, then a logical one is introduced to the least significant bit of the binary number. The second shift around determines the logical state of the second least significant bit of the binary number and so on for the total of 16 bits as clearly indicated on the timing diagram.

The combination of the variable address on lines VA 1, 2, 4 and 8, variable load signal VL, and variable function signal VF at the variable data buffer input selectors 48 enable the WR51 signal to pass on the V0I line into the V0 buffer of the variable data buffers 40. If VA 1, 2, 4, 8 represented a five then the V5I line would have been selected. The variable data buffer shift clock pulses SVB from the system control 34 coincide with the every fifth word forming register shift clock pulse SWR. In this way, the remainder of each divide by two operation is shifted into the V0 variable data buffer as a binary number.

In a similar manner, the input information associated with the second V letter is read in and the processing of this information is initiated by the reading of the third V letter. The reading of the end of block asterisk (*) initiates the processing of the information associated with the third V letter. Also, the end of block asterisk indicates that all information associated with this block of input data has been read in and the variable load signal VL is reset by the system control 34.

Each buffer V0 – V9 of the variable data buffers 40 receive shift clock pulses during each data processing cycle, but except for the specific variable data buffer selected by the variable data buffer input selector 48, the binary values in each of the variable data buffers are re-circulated unchanged.

After all of the scaler information has been loaded into the variable data buffers the system is ready for processing command instructions from the input program on punched tape 10. The operator selects the input mode from the operators control panel 32.

Assume for illustrative purposes that the first command instruction reads as follows:

G1XV0SDV2YHV1A21*

G1 is the preparatory function indicating that this block of data describes a linear move requiring X and Y command data only. In the case of a circular move, I and J command data would be processed in the same manner as the X and Y command data.

In the input data following G1, the characters X and Y (and I and J if present) indicate command processing operations, the V addresses determine the variable numbers which are to be used for establishing the command data words, and the letters D (double), H (half), A (add) and S (subtract) describe the manner of operation in which the variable numbers and/or numerical data from the input program is to be combined to arrive at the command data values for each of the coordinates at the command data values for each of the coordinates X, Y, I and J respectively. Thus, the reading of a V, D, H, A, or S letter will not reset the X function or Y function flip-flop. Also a V letter will not reset a D, H, A, or S function flip-flop (DF, HF, AF, or SF) signal since the DF, HF, AF, or SF signal respectively is only an operator on the selected data to follow.

Going back to our example, the next character after G1 is the letter X which sets the X function flip-flop generating the signal XF. This enables the command data buffer input selector 50 for the X buffer (FIG. 4C) to enter numerical data from the adder-subtractor 60 (FIG. 4F) on its output line CDBI, and also enables the command data buffer storage selector 58 to pass on its output line CDB0 numerical data from the X command data buffer 54. The Y, I, and J command data buffers, 55, 56 and 57 respectively will merely recirculate their data unchanged during any shifting because their respective function flip-flops (YF, IF, and JF) are reset at this time.

The next character, the letter V, sets the variable address signal VA and the V function flip-flop generating VF. The following character identifies the variable address buffer as V0. The reading of the letter S indicates that the first factor in determining the X command value has been completely defined by the input data and that the number contained in the V0 variable buffer should be transferred into the X command data buffer 54 as described below.

Refer to the timing diagram FIG. 6a for data processing cycle number one. This timing diagram assumes that the variable data buffers contain the loaded information as per the earlier example. Thus the address number 0 in the variable address register 42 on lines VA 1,2,4 and 8 causes the Variable Buffer Selector 62 to select V0B0 from the variable data buffers 40 which data is passed out onto line VB0. The VF signal enables the selection of VB0 in the arithmetic data input selector 64. The reading of the letter S initiates a data processing cycle and sixteen variable data buffer shift clock pulses SVB are generated by the system control 34. The data from the V0 buffer ( the number 11 in binary ) is now shifted out on the AIN output line of selector 64 with this clock. The data AIN enters the doubler-halver circuit 66 and, in the absence of either a D function (DF signal), or H function (HF signal), the data delay one bit circuit 68 is selected by the data delay selector 70. Thus, the output ADH is the number from the V0 buffer, but delayed one bit. Although the letter S initiated the data processing cycle the S function signal SF is not set until the end of this data processing cycle leaving the adder-subtractor 60 set up to add until such event. Hence, the number on the ADH line is added to CDB0 representing the contents of the X command data buffer 54 containing initially the value of zero. The result on line CDBI is shifted into the X command data buffer 54 by the command data buffer shift clock pulses SCDB generated from the system control 34. As the timing diagram shows, the command data buffer shift clock line has the same number of clock pulses as the variable data buffer shift clock line, but the shift clock timing of the command data buffers 22 is displaced one clock time later than the shift clock timing of the variable data buffers 40. This one clock time delay coincides with the one bit delay introduced in the data by the doubler-halver circuit 66, and so the number from the V0 buffer is loaded into the X command data buffer 54 unchanged (the number 11 in binary form, 0000000000001011).

At the end of the above data processing cycle, the S function flip-flop (SF) is set indicating that the next number is to be subtracted from the contents of the X command data buffer 54. The D letter sets the D function flip-flop generating DF thereby indicating that the next number is to be doubled. The next two characters V and 2 identify the variable address i.e., which of the variable data buffers 40 contains the numerical data to be processed. Thus, the command instruction requires that double the contents stored in V2 must be subtracted from the contents in the X command data buffer 54. Upon reading the letter Y, a further data processing cycle is initiated which accomplishes the above operation as hereafter explained in connection with data processing cycle number two of timing diagram FIG. 6b.

The variable buffer selector 62 now selects the V2 buffer and so the arithmetic data input selector 64 now passes onto line AIN the contents of V2 (the number 3 in binary form, 0000000000000011). In the doubler-halver circuit 66, the D function signal DF causes the data delay selector 70 to select the data from the data delay two bit circuit 72. The clock timing to the command data buffers 22 is delayed one bit as mentioned before, so the data delay of two bits in conjunction with a timing delay of one bit causes the data to appear at the input ADH of the adder-subtracter circuit 60 with a one bit delay with respect to the clock timing of the command data buffers 22. Delaying the binary number one bit has the effect of shifting the number one place to the left, or doubling it. Thus the number presented to the adder-subtracter circuit 60 on input line ADH is the number 6 in binary form (0000000000000110). Simultaneously, the output of the X command data buffer 54, the number 11 in binary form (0000000000001101), is applied as the other adder-subtracter input on line CDBO. The S function signal SF sets up the adder-subtracter 60 to subtract the number on line ADH from the number on line CDBO yielding, on output line CDBI, the number 5 in binary form (0000000000000101). This number is passed on line XCBI to the input of the X command data buffer 54. Since it was the letter Y which initiated this data processing and command data transfer cycle, the X function flip-flop (XF) is now reset completing the calculation of the X command. The data now stored in the X command data buffer 54 represents the X coordinate value for the next increment of machine motion.

At the end of the above data processing cycle, the Y function flip-flop will set the signal YF. The reading of the letter H will set the H function flip-flop generating HF which indicates that the numerical data following will be halved. This data will be obtained from the contents in the V1 buffer. Upon reading the letter A, the operation is initiated as shown on the timing diagram for data processing cycle number three of FIG. 6B. The halving of V1 (the number 14 in binary form, 0000000000001110) is accomplished by selecting the un-delayed data at the data delay selector 70. This, in conjunction with the timing delay of one bit in the command data shift clock pulses, causes the data to be advanced one bit to the right which halves the number. Thus at the adder-subtracter 60, the number 7 in binary form (0000000000000111) is added to the number 0 on line DCBO representing the initial contents from the Y command data buffer 55, and the result is put into the Y command data buffer 55.

The letter A defines the next operation as an add operation setting the A function flip-flop. However, the AF signal is not needed at the adder-subtracter circuit 60 because an add operation is assumed in the absence of an S function (SF signal). The number characters following the letter A are not operands since they are not prefaced with the letter V and hence, represent numerical data to be taken from the input program itself (the number 21). This number is thus routed in binary coded decimal form from the data source selector 38 through the word forming register input 44 and loaded into the word forming register 46, in bit parallel character serial form. Upon reading the end of block asterisk (*), a data processing cycle is initiated (refer to data processing cycle number four in FIG. 6B). A binary coded decimal to binary conversion is performed as described hereinbefore except that the binary result on line WR51 is now selected by the arithmetic data input selector 64. This number is delayed one bit in the doubler-halver circuit 66 and again, because of the one bit delay in the clock timing, passes unchanged into the adder-subtracter 60. Thus the number 21 in binary (0000000000010101) is added to the number 7 in binary (0000000000000111) from the Y command data buffer 55, and the result, the number 28 in binary (0000000000011100) is shifted into the Y command data buffer 55.

The end of block asterisk(*) indicates that the entire block of input data has been read and processed and that the command data is ready for a signal from the path control 24. The path control 24 receives the command data values on lines XCBO, YCBO, ICBO, and JBCO which information is shifted out from the command data buffers 22 with a clock signal from the system control 34. The system then proceeds reading the next command instruction from the input program.

What is claimed is:

1. For use in a system for automatically controlling the motion of a machine, said system having at least a memory section, a character recognition section, a data processing section, an output command data storage section and direction control means for directing said machine along any prescribed path defined by the coordinates of said path along axes perpendicular to each other; a method for directing the operation of said system from an input program representing a series of command instructions with each command instruction represented by an array of characters defining the coordinates of a predetermined segment of said prescribed path in terms of algorithms, said method comprising the steps of:

a loading into said memory section scaler information from which the coordinate dimensions of each predetermined segment may be established;

b consecutively feeding each character from said input program into said character recognition section of said system;

c identifying each character to determine if it is an operand or numerical data;

d generating a predetermined control signal in response to each operand;

e selecting scaler information from said memory section in response to a first set of predetermined control signals;

f processing said selected information in response to a second predetermined control signal;

g approximately simultaneously transferring the processed information into said output command data storage section; and h repeating the steps of (b) through (g) until a third predetermined control signal is generated representing the end of said command instruction whereby the command data storage information is transferred into said direction control means to direct the motion of said machine.

2. For use in a system as defined in claim 1 further including a word storage section, said method in addition comprising:

storing said numerical data prior to step (e) and selecting in step (e) the combination of scaler information from said memory section and said numerical data in response to said first set of predetermined control signals.

3. For use in a system as defined in claim 2 wherein each character on said input program representing a number is fed in a binary coded decimal format and wherein said processing step (f) converts each number to binary.

4. For use in a system as defined in claim 3 wherein said processing step (f) further performs any combination of the mathematical operations of adding, subtracting, doubling and halving.

5. For use in a system as defined in claim 4 wherein said scaler information is loaded manually into memory in binary coded decimal form from a keyboard.

6. For use in a system as defined in claim 4 wherein said scaler information is loaded automatically into memory from a prepared program containing the scaler information.

7. A system for automatically directing the movement of a machine along any prescribed path, defined by the coordinates of said path along axes perpendicular to each other, from an input program containing a series of command instructions arranged in a predetermined sequence with each command instruction represented by an array of characters defining the coordinates of a predetermined segment of said prescribed path in terms of algorithms, said system comprising:
 a a memory section including a multiple number of data registers;
 b data input means for loading into said data registers scaler information from which the coordinate dimensions of each predetermined segment may be established;
 c character recognition means for generating a control signal in response to each character operand of each command instruction;
 d means for consecutively feeding each character of a command instruction from said input program to said character recognition means;
 e means for selecting predetermined data registers from said memory section in response to successive sets of predetermined control signals;
 f command data storage means for storing numerical data representing the coordinate dimensions of each predetermined segment;
 g transfer means for transferring the selected data from said predetermined data registers into said command data storage means in response to control signals representing predetermined operands; and
 h path control means responsive to said numerical data in said command data storage means for directing said machine.

8. A system as defined in claim 7 further comprising;
 word storage means for storing numerical characters from said character recognition means;
 means for arithmetically processing the data selected from said predetermined data registers and any numerical data stored in said word storage means and wherein said transfer means transfers said processed data into said command data storage means.

9. A system as defined in claim 8 wherein said data input means supplies said memory section with scaler information represented by a series of decimal numbers, in binary coded decimal form, with each decimal number associated with a code symbol identifying a predetermined data register in said memory section, said system further comprising;
 means for converting each binary coded decimal number to a corresponding binary number and means for transferring said binary number into the allocated register of said memory section in response to said coded symbol.

10. A system as defined in claim 9 wherein said coded symbol represents at least one letter character and one numerical character and wherein said character recognition means identifies said characters for allocating the transfer of the binary number associated therewith into a predetermined data register.

11. A system as defined in claim 10 wherein said data input means is a manually operated keyboard.

12. A system as defined in claim 10 wherein said data input means is a stored input program.

* * * * *